(12) United States Patent
Taira (10) Patent No.: US 7,423,223 B2
(45) Date of Patent: Sep. 9, 2008

(54) CONSTRUCTION TO SECURE A WASHER TUBE TO A GROMMET

(75) Inventor: Toshinobu Taira, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 522 days.

(21) Appl. No.: 11/119,910

(22) Filed: May 3, 2005

(65) Prior Publication Data
US 2005/0253384 A1    Nov. 17, 2005

(30) Foreign Application Priority Data
May 12, 2004    (JP)    ............................. 2004-142071

(51) Int. Cl.
*H02G 3/18*    (2006.01)
(52) U.S. Cl. ............... 174/650; 174/153 G; 174/152 G; 16/2.1; 16/2.2; 248/56
(58) Field of Classification Search ................. 174/650, 174/659, 135, 152 R, 153 G, 152 G, 72 A, 174/68.3; 16/2.1, 2.2; 248/56; 439/274, 439/275, 607, 587, 604; 285/149.1
See application file for complete search history.

(56) References Cited

U.S. PATENT DOCUMENTS

| 5,448,017 | A |  | 9/1995 | Nakajima et al. |  |
| 5,911,450 | A | * | 6/1999 | Shibata et al. | ............. 174/72 A |
| 6,278,060 | B1 |  | 8/2001 | Mori |  |
| 6,479,748 | B2 | * | 11/2002 | Mori | ....................... 174/153 G |
| 6,486,400 | B1 | * | 11/2002 | Smutny et al. | ........... 174/153 G |
| 6,901,627 | B2 | * | 6/2005 | Uchida | ......................... 16/2.1 |
| 6,933,439 | B2 | * | 8/2005 | Nishihara et al. | ........... 174/68.3 |
| 7,053,311 | B2 | * | 5/2006 | Santanda | ..................... 174/135 |

FOREIGN PATENT DOCUMENTS

JP    11-321576    11/1999
JP    2004359025 A  * 12/2004

OTHER PUBLICATIONS

English Language Abstract of JP 11-321576.

* cited by examiner

*Primary Examiner*—Angel R Estrada
(74) *Attorney, Agent, or Firm*—Greenblum & Bernstein, P.L.C.

(57) ABSTRACT

A construction is provided having an expanded diameter tube on at least one end of a small diameter tube through which an electrical wire group of a wire harness passes. In addition, a washer tube is secured to a grommet formed from an elastic body, and a vehicle latching groove is provided on the outer peripheral surface of the expanded diameter tube. A tube securing material is provided that includes a large diameter ring and a small diameter ring protruding from one part of the outer peripheral surface of the large diameter ring. The large diameter ring of the tube securing material is placed and secured on the outer surface of the small diameter tube, and the washer tube is passed through the small diameter ring, securing the washer tube along the outer surface of the small diameter tube.

17 Claims, 9 Drawing Sheets

PRIOR ART

FIG. 8

PRIOR ART

FIG. 9

CONSTRUCTION TO SECURE A WASHER TUBE TO A GROMMET

BACKGROUND OF THE INVENTION

1. Field of the Invention

The present invention relates to a construction that secures a washer tube arranged in an automobile to a grommet, and more specifically, is arranged by securing a washer tube, in which window washer fluid flows to a spray nozzle, to a grommet extending between a vehicle panel and a door panel.

2. Description of Related Art

Conventionally, when contaminates adhere to the front window glass or rear window glass of an automobile, a spray nozzle mounted to the hood or rear door sprays washer fluid onto the window glass and the wipers wipe the glass surface to remove the contaminates.

Normally, the washer fluid is stored in a specified tank inside the engine compartment and is supplied to the spray nozzle through a washer tube formed from a resin or a rubber elastomer.

Figure 8:
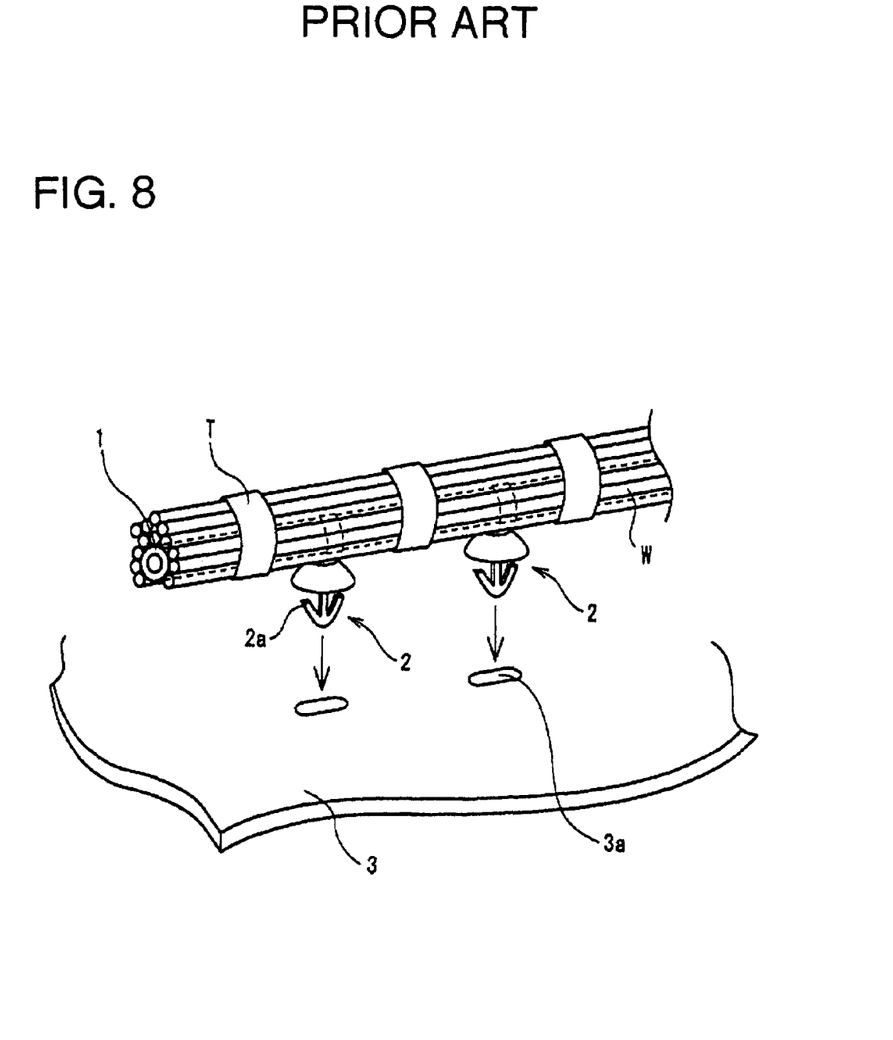
FIG. 8 is an example of the prior art.

The applicants offered a construction in which a washer tube was arranged in a vehicle panel in Japanese Patent Publication 11-321576 and as shown in FIG. 8, the washer tube 1 is arranged together with the electrical wire group W by opening a required gap in the washer tube 1, mounting a hand clamp 2, wrapping a tape T around the electrical wire group W in which the washer tube 1 is placed, and inserting and latching a latch assembly 2*a* of the hand clamp 2 in a latch hole 3*a* cut into a vehicle panel 3.

Figure 9:
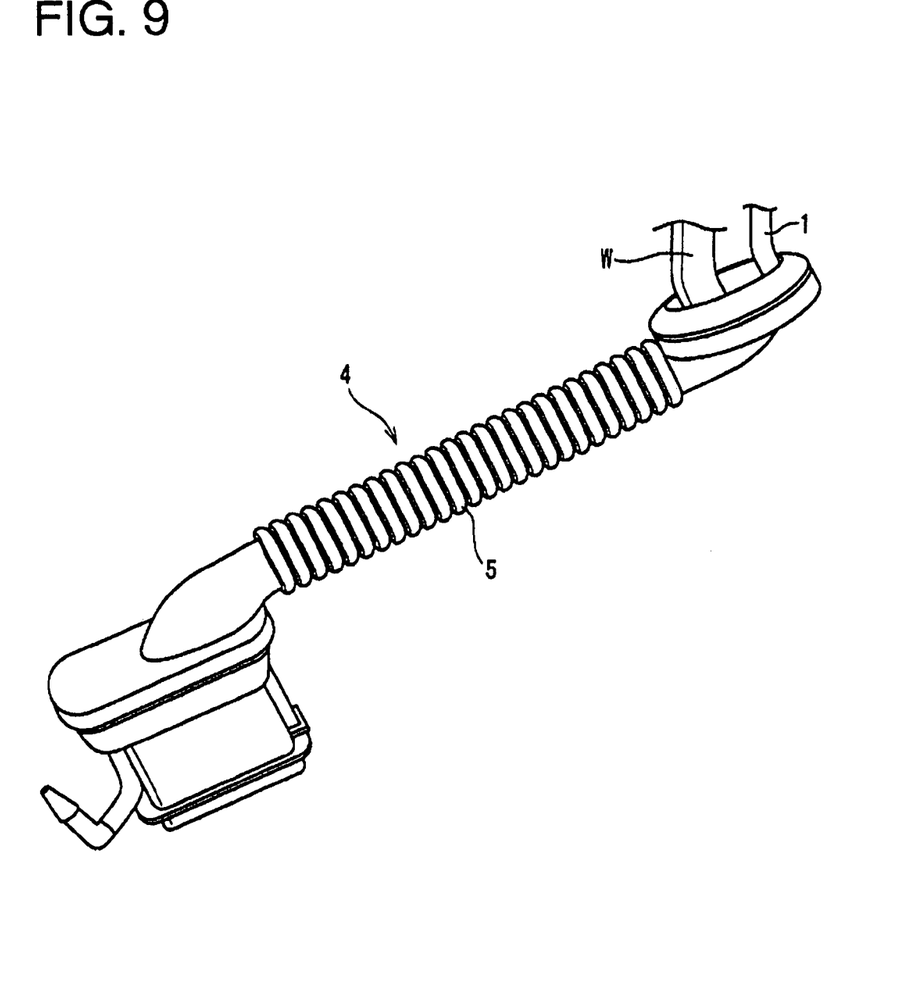
FIG. 9 is another example of the prior art.

In addition, when linking a washer tube to a spray nozzle installed in a rear door, the washer tube 1 must extend between the vehicle panel and the door panel. As shown in FIG. 9, the washer tube, with electrical wire group W, is inserted and passes through the inside of a small diameter tube 5 of a grommet 4 that extends between the vehicle panel and the door panel.

However, as shown in FIG. 9, if the washer tube 1 is arranged passing through the inside of the small diameter tube 5 of the grommet 4 and the grommet 4 and washer tube 1 are bent due to the opening/closing action of the rear door, the inner peripheral surface of the small diameter tube 5 and the outer peripheral surface of the washer tube 1 will rub against each other inside the narrow small diameter tube 5. Since the washer tube 1 and the grommet 4 are both formed from a rubber or an elastomer, the washer tube 1 will be damaged due to friction, resulting in the danger of fluid leaks.

SUMMARY OF THE INVENTION

The present invention takes the problems mentioned above into consideration and attempts to prevent damage to the washer tube due to rubbing of the washer tube and grommet, by simply retaining and securing the washer tube on the outer peripheral surface of the small diameter tube without inserting the washer tube inside the small diameter tube of the grommet.

One feature of the present invention is to provide a construction to secure a washer tube to a grommet characterized by a construction with an expanded diameter tube on at least one end of a small diameter tube through which an electrical wire group of a wire harness extends and also has a washer tube secured to a grommet, formed from an elastic body. In addition, whereon a vehicle latching groove is provided on the outer peripheral surface of the expanded diameter tube. Also, a tube securing material is provided that includes a large diameter ring and a small diameter ring in which the small diameter ring protrudes from one part of the outer peripheral surface of the large diameter ring. The large diameter ring of the tube securing material is externally pressed onto the small diameter tube and secured, along with the washer tube being passed through the small diameter ring, resulting in the washer tube being secured along the outer surface of the small diameter tube.

According to this composition, using a tube securing material integrally provided with a large diameter ring and a small diameter ring makes it possible to externally fit the large diameter ring into the small diameter tube of the grommet, along with making it possible to secure the washer tube to the outer peripheral surface of the small diameter tube by only inserting the washer tube into the small diameter ring, thereby making it possible to simplify the securing action of the washer tube.

Furthermore, because a gap can be provided between the small diameter tube and the washer tube when the washer tube is inserted into the small diameter ring, even if the grommet and washer tube are bent due to the opening and closing action of the door, they can be reliably prevented from rubbing together.

In this manner, because the tube securing material is used for securing the washer tube along the outer peripheral surface of the small diameter tube without inserting the washer tube inside the small diameter tube of the grommet, it is possible to eliminate the grommet and washer tube from rubbing together when they are bent due to the opening and closing action of the door, thereby making it possible to prevent damage to the washer tube and also to prevent fluid leaks.

The tube securing material may be produced from any suitable material, such as rubber, and is secured on the small diameter tube of the grommet in certain intervals in the lengthwise direction in the small diameter tube of the grommet. When the tube securing material is produced from rubber in this manner, the large diameter ring can expand and be easily pressed into the small diameter tube of the grommet and secured. In addition, because the tube securing material is produced from, for example, rubber, it is still possible to achieve the above effect even if the outer diameter of the small diameter tube is slightly different.

When the small diameter tube is short, the washer tube can be retained, even if only one tube securing material is used. When the small diameter tube is long, the tube securing material is fitted at positions on both sides or, as necessary, at a position in the middle, and the washer tube arranged along the outer peripheral surface of the small diameter tube.

A convex portion is provided on one part of the outer peripheral surface of the small diameter tube and a positioning protrusion is provided on one part of the large diameter ring of the tube securing material. The positioning protrusion has a concave portion with which the convex portion of the small diameter tube meshes.

With this composition, the tube securing material can be easily fitted in the small diameter tube while positioned in the lengthwise direction and peripheral direction just by meshing the concave portion of the large diameter ring into the convex portion of the small diameter tube.

The small diameter tube of the grommet is formed into an accordion shape and is provided with continuously and alternately rising and falling portions (e.g., ridges and depressions), along with an annular tube meshing groove provided where the large diameter ring of the tube securing material is externally pressed therein. The convex portion is also provided on the bottom surface of the meshing groove.

The small diameter ring that protrudes on the outer peripheral surface of the large diameter ring of the tube securing material and the positioning protrusion are positioned with a certain angular gap (e.g., offset), which corresponds to the type of vehicle in which the device will be installed. In other words, the small diameter ring and the positioning protrusion are provided at opposing positions 180° apart. Alternatively, the small diameter ring is oriented at +90 degree or −90 degree from the positioning protrusion as a support point. When the offset is relatively small, different colors may be used for the tube securing material, making it easier to distinguish between different tube securing materials. Because the position where external interference material is arranged differs including the vehicle body panel position corresponding to the type of vehicle, this angular gap sets the position of the small diameter ring at a position where the washer tube does not interfere with the external interference material and thereby prevents damage to the washer tube.

In addition, the position of the small diameter ring can be changed by providing one type of tube securing material provided at opposing positions and then changing the position of the convex portion of the small diameter tube where the concave portion of the large diameter ring is fit into.

Further, a plurality of small diameter rings (for example two) can be provided on the outside surface of the large diameter ring. For this case, the washer tube and antenna cable can be retained along the outer surface of the small diameter tube.

The washer tube secured via the tube securing material on the outer surface of the small diameter tube is inserted into a through-hole provided on the expanded diameter tube of a grommet and extends from an open end of the expanded diameter tube. The through-hole provided on the expanded diameter tube is formed as an open end by cutting off a closed wall when inserting the washer tube.

According to this composition, a through-hole can be provided that cuts off the closed wall of only the tube end of the grommet that secures the washer tube and then allows the washer tube to pass through. This makes it possible to use both a grommet that secures the washer tube and a grommet that does not secure the washer tube.

Another feature of the present invention is to provide a grommet assembly that includes a washer tube, a main tube through which an electrical wire group extends, a first end tube connected to a first end of the main tube and having a larger diameter than the main tube, a second end tube connected to a second end of the main tube and having a larger diameter than the main tube, and a washer tube securing element. The washer tube securing element includes a member having a main tube ring and a washer tube ring. The main tube extends through the main tube ring and the washer tube extends through the washer tube ring.

The grommet assembly may include a projection provided on the main tube ring, a recess provided in the main tube ring that is formed at a location on the main tube ring corresponding to the projection, and a generally convex portion provided on at least one portion of an outer surface of the main tube. The generally convex portion extends into the recess to secure the washer tube to the grommet assembly.

The washer tube ring may be spaced from the projection by an angle of 180 degrees. The washer tube ring may be spaced from the projection by an angle of 90 degrees.

The main tube may contain a series of intermittent ridges and depressions. Further, a through-hole may be formed in the first end tube end the second end tube, so that the main tube extends into either or both the first and second end tubes.

When there is a small amount of electrical wire passing through the grommet and there is no danger of damage due to rubbing even if the washer tube passes through the inside of the small diameter tube, the device can still be used without opening a through-hole.

As described above, according to the present invention, because the securing material is used for securing along the outer peripheral surface of the small diameter tube when arranging a washer tube together with a grommet, rubbing together of the grommet and washer tube is eliminated when they are bent due to the opening and closing action of the door thereby making it possible to prevent damage to the washer tube and also to prevent fluid leaks.

Consequently, it is possible to suitably use the device when arranging electrical wire and a washer tube between the vehicle panel and rear door.

Even further, when a positioning protrusion is provided on the tube securing material, meshing the convex portion of the outer peripheral surface of the small diameter tube of the grommet into this protrusion makes it possible to secure the tube securing material to the peripheral surface of the small diameter tube thereby preventing the occurrence of positional shifting in the lengthwise and peripheral directions, and also if the washer tube is secured to a suitable position beforehand, interference of the washer tube with the external interference material and subsequent damage is prevented.

It would be desirable to provide a construction that causes no damage to a washer tube arranged along a grommet.

BRIEF DESCRIPTION OF THE DRAWINGS

The above, and other objects, features and advantages of the present invention will be made apparent from the following description of the preferred embodiments, given as non-limiting examples, with reference to the accompanying drawings in which.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

The following will describe the preferred embodiments of the invention with reference to the drawings. FIGS. 1 through 7 show an embodiment of the present invention. In these figures, the grommet 10 is produced from any suitable material, such as natural or synthetic rubber or other elastomer, and is installed as to extend between the vehicle body and rear door of the automobile.

The grommet 10 has a long accordion shaped small diameter tube 11 through which an electrical wire group W of a wire harness passes. Expanded diameter tubes 12, 13 are provided at both ends of the small diameter tube 11. The electrical wire group W of a wire harness is inserted into the inside of the expanded diameter tube 12, small diameter tube 11, and the expanded diameter tube 13, while the rubber washer tube 20, through which washer fluid passes, is secured by the tube securing material 30 along the outer peripheral surface of the small diameter tube 11. The washer tube 20, secured by the tube securing material 30 to the outer peripheral surface of the small diameter tube 11, is passed through the through-holes 12b-3, 13-b-3 provided on the expanded diameter tubes 12, 13. Thus, the washer tube 20 is inserted inside the expanded diameter tubes 12, 13 and then pulled to the outside from the open end of the expanded diameter tubes. The spray nozzle 21, secured to the rear door, is connected to the end of the washer tube 20 and is pulled from the inside of the expanded diameter tube 12.

Figure 1:
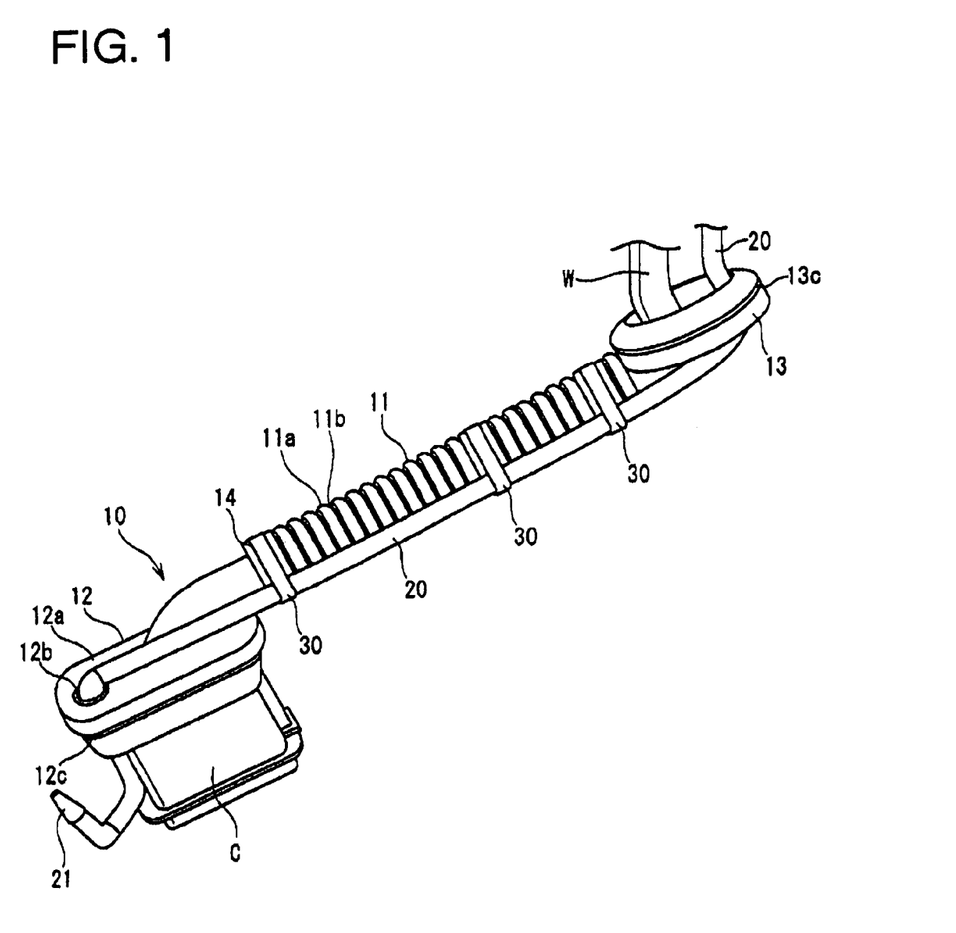
FIG. 1 is a drawing that shows an electrical wire group passing through a grommet in a state in which a washer tube is secured, according to an embodiment of the present invention.
Figure 2:
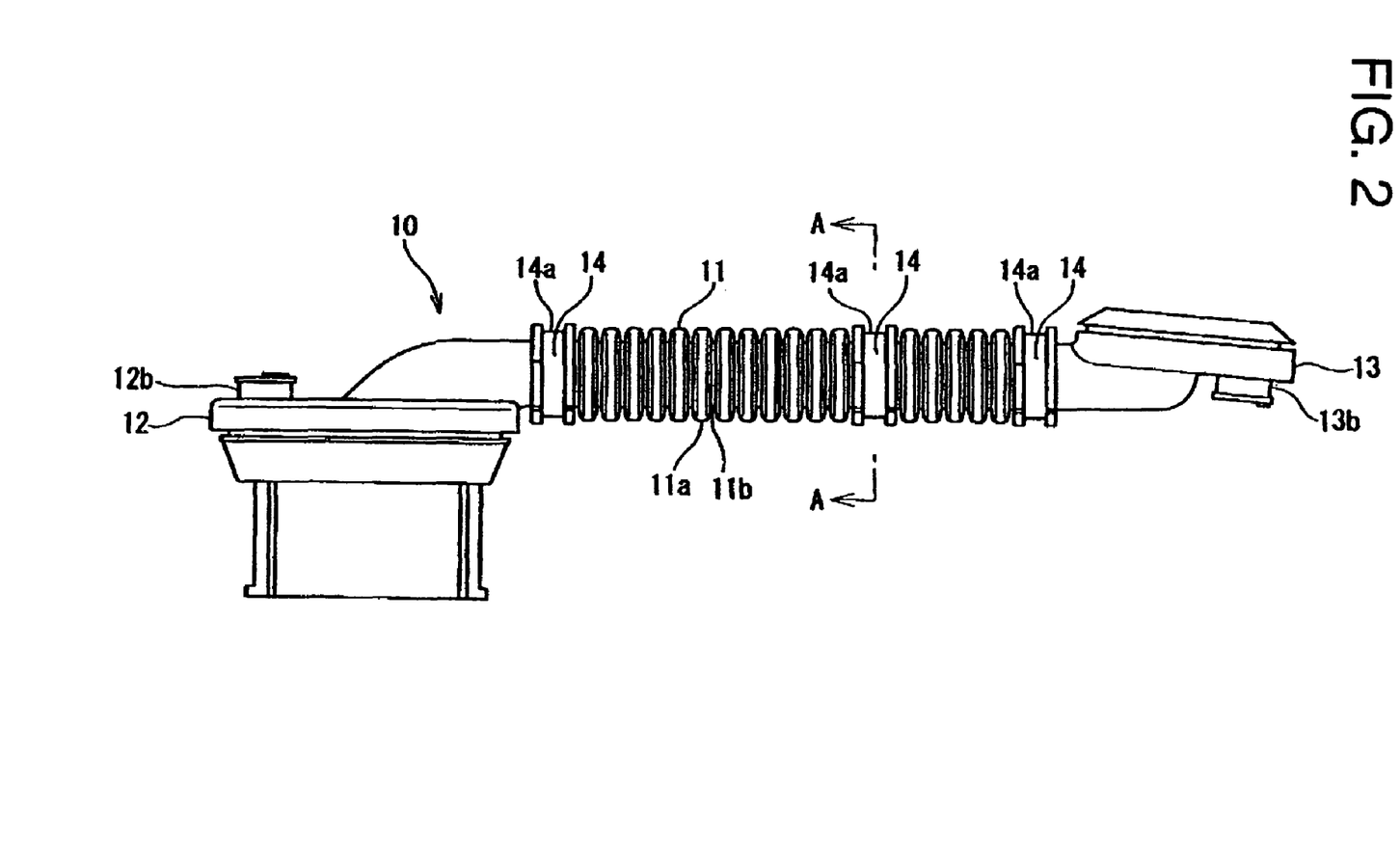
FIG. 2 is a front view of the grommet, of the embodiment of FIG. 1.
Figure 3:
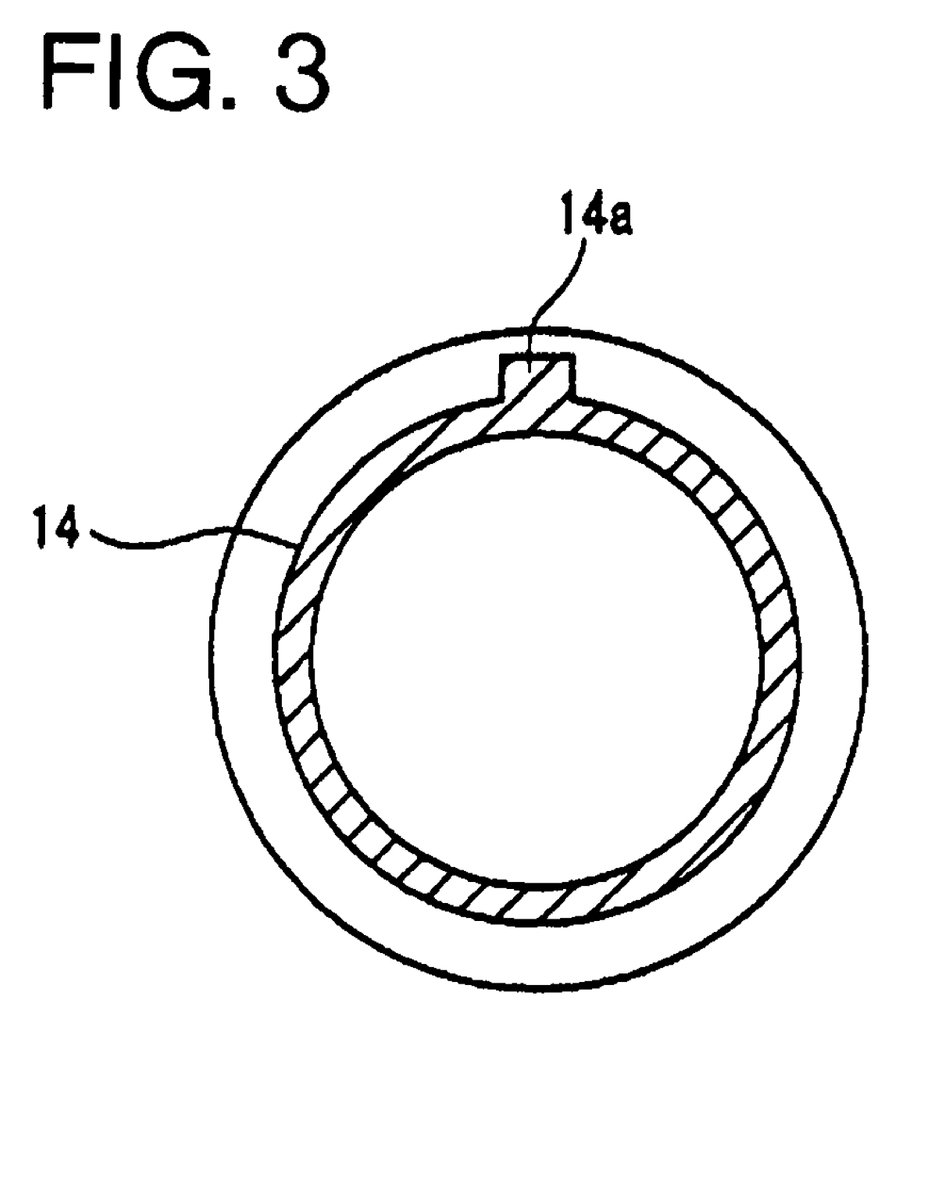
FIG. 3 is a cross-sectional view of the grommet, along the lines A-A in FIG. 2.

The small diameter tube 11 of the grommet 10 is generally accordion shaped and is provided with continuously rising 11a and falling portions 11b along the entire length. As shown in FIG. 2, annular tube meshing grooves 14 are provided at three locations on both ends of the small diameter tube 11 in the lengthwise direction, and at a center portion. As shown in FIG. 3, a convex portion 14a used for positioning the washer tube is provided on the bottom surface of the tube meshing grooves 14.

Figure 4A:
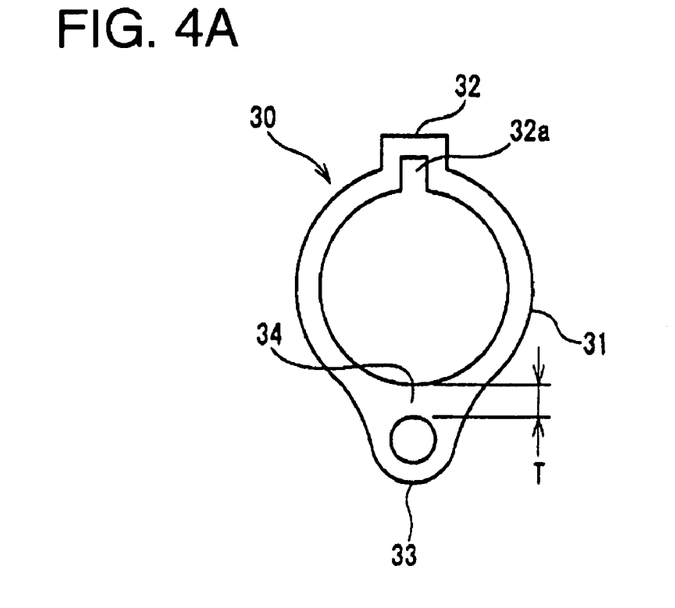
FIG. 4A is a front view of the tube securing material, of the embodiment of FIG. 1

The tube securing material 30 is produced from any suitable material, such as natural or synthetic rubber, that freely expands and contracts, and as shown in FIG. 4A, is integrally provided with a large diameter ring 31 and a small diameter ring 33 that is smaller than one portion of the outer peripheral surface of the large diameter ring 31. The inner diameter of the large diameter ring 31 is almost the same as the outer diameter (as well as almost the same as the width) of the tube meshing grooves 14. In addition, an open-square shaped positioning protrusion 32 protrudes from the inner peripheral surface, at a position shifted 180° from the small diameter ring 33. A concave portion 32a is also provided where the convex portion 14a is externally pressed into this inside area.

Figure 4B:
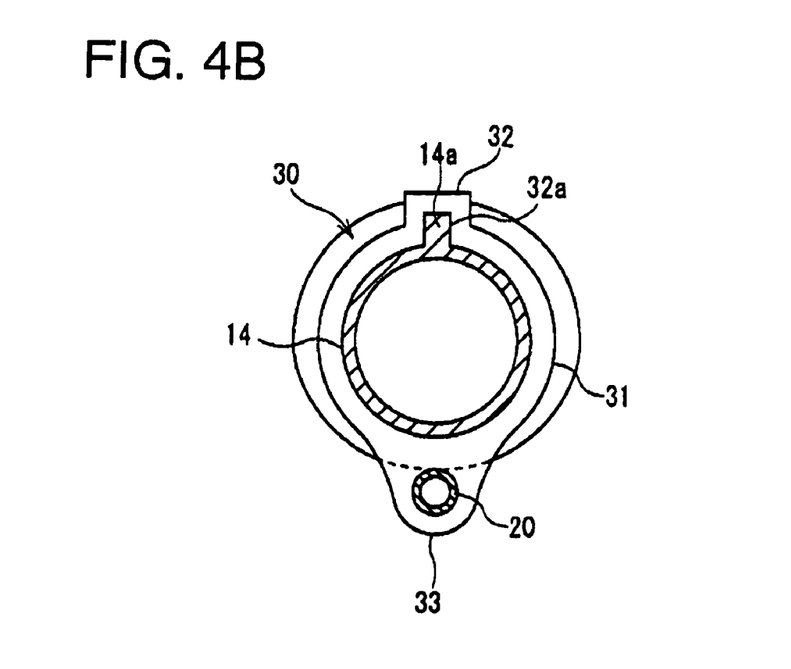
FIG. 4B is a view that shows a state in which a washer tube passes through a small diameter ring of the tube securing material attached to the grommet, of the embodiment of FIG. 1.

As shown in FIG. 4B, to secure the tube securing material 30 and the small diameter tube 11, the large diameter ring 31 of the tube securing material 30 is expanded and externally pressed into the tube meshing groove 14. The concave portion 32a of the positioning protrusion 32 is externally pressed into the convex portion 14a thereby securing the tube securing material 30 and the small diameter tube 11 in a state that does not allow positional shifting in the peripheral direction and the lengthwise direction.

Figure 5A:
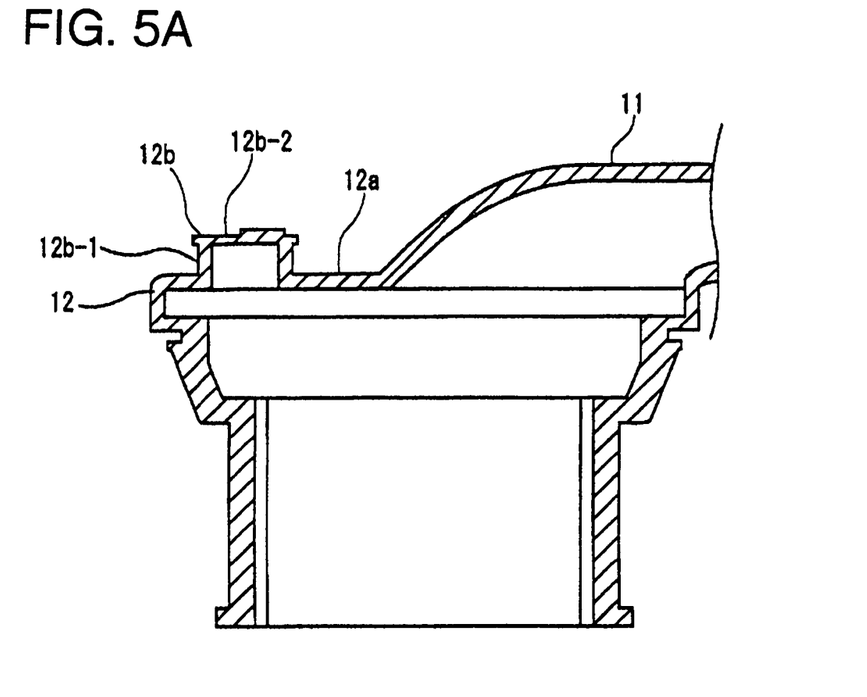
FIG. 5A shows a cross-sectional view of a washer tube insertion member on a first end of an expanded diameter tube, before removing a closed wall, of the embodiment of FIG. 1.
Figure 5B:
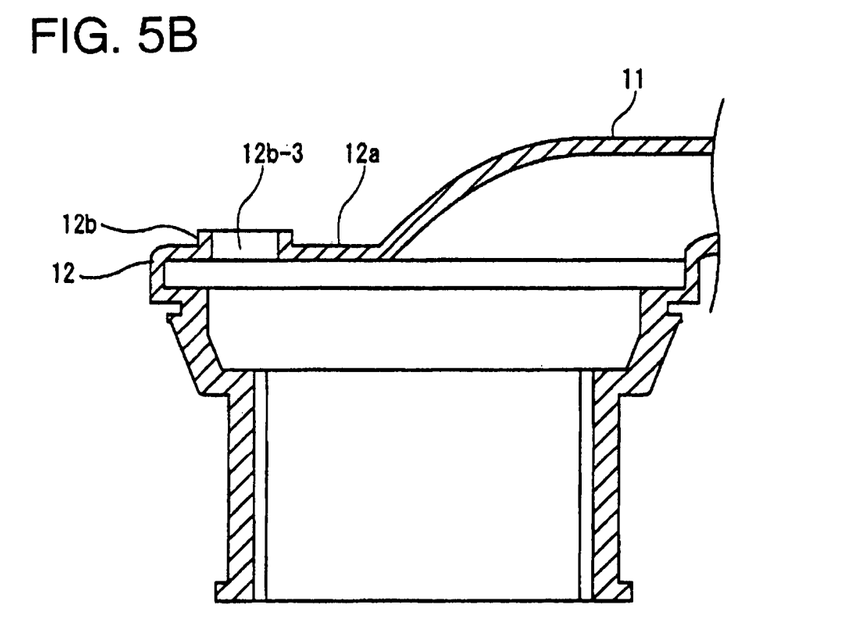
FIG. 5B shows a cross-sectional view of a washer tube insertion member on a first end of an expanded diameter tube, after removing a closed wall, of the embodiment of FIG. 1.
Figure 6A:
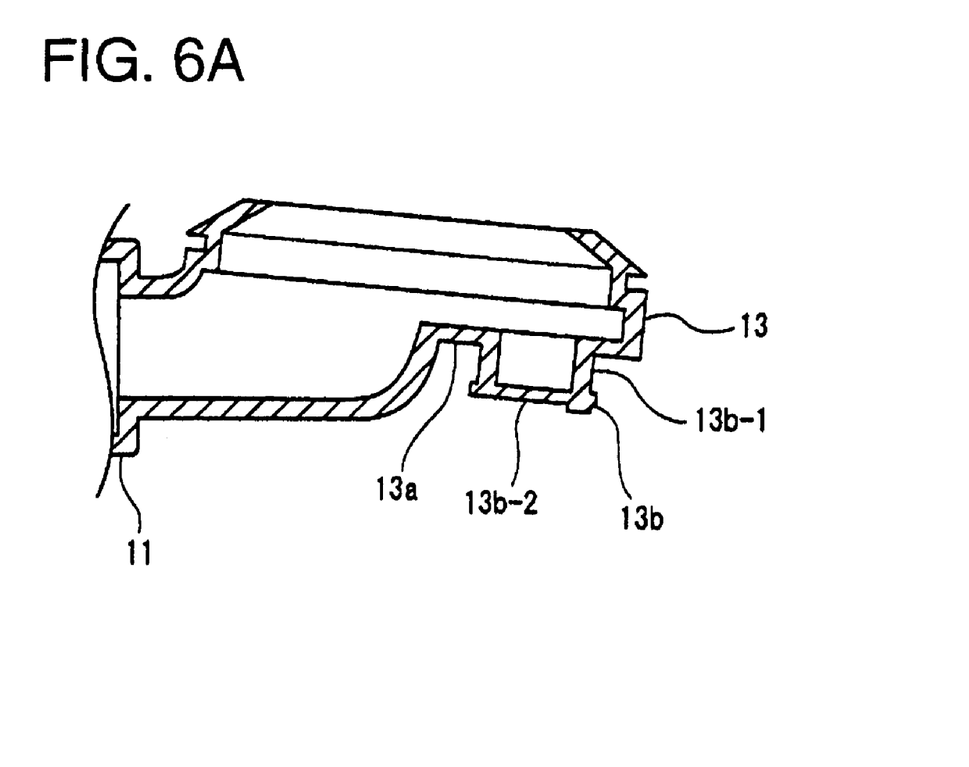
FIG. 6A shows a cross-sectional view of a washer tube insertion member on a second end of an expanded diameter tube, before removing the closed wall, of the embodiment of FIG. 1.
Figure 6B:
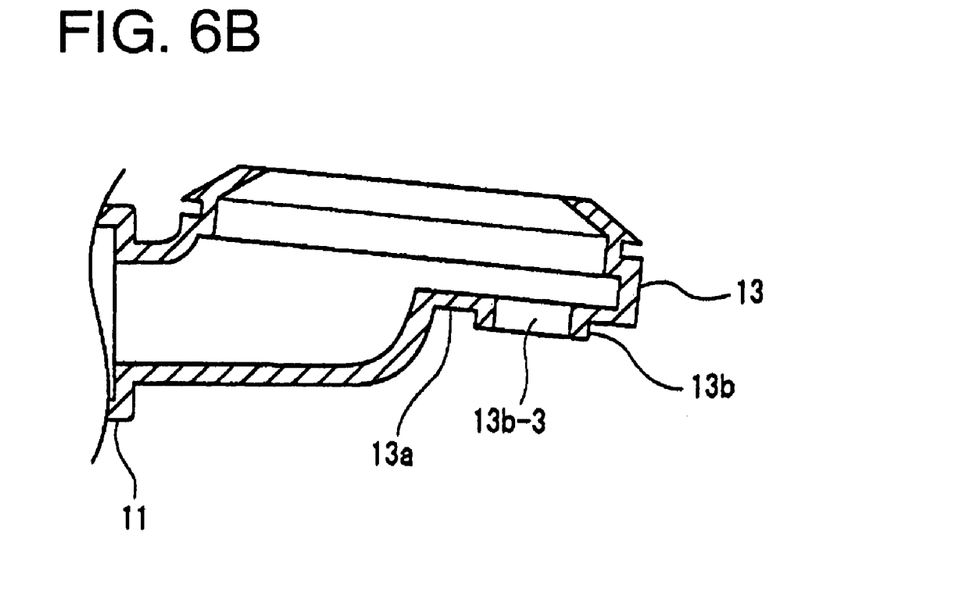
FIG. 6B shows a cross-sectional view of a washer tube insertion member on a second end of an expanded diameter tube, after removing the closed wall, of the embodiment of FIG. 1.

Because the fitted washer tube 20 is inserted into the small diameter tube 11 through the tube securing material 30, cylindrical-shaped washer tube insertion assemblies 12b, 13b protrude from outer surfaces of bottom wall assemblies 12a, 13a, which connect to the small diameter tube 11 on the expanded diameter tubes 12, 13 of the grommet 10, as shown in FIGS. 5 and 6. The ends of the cylinders 12b-1, 13b-1 of the washer tube insertion assemblies 12b, 13b are closed at closed walls 12b-2, 13b-2 as shown in FIGS. 5A and 6A. When inserting the washer tube 20, through-holes 12b-3, 13b-3 are formed as shown in FIG. 5 (B) and FIG. 6 (B) by cutting off the cylinders 12b-1, 13b-1, removing the closed walls 12b-2, 13b-2, and allowing the washer tube to pass through.

Furthermore, vehicle latching grooves 12c, 13c are provided on the outer peripheral surfaces of the expanded diameter tubes 12, 13. The vehicle latching grooves 12c, 13c fit into the peripheral edge of the through-holes cut into the vehicle panel and door panel (not shown in the figure) and seal and secure the expanded diameter tubes 12, 13 of the grommet 10 to the vehicle panel and the door panel.

To fit the washer tube 20 to the grommet 10, the washer tube is inserted inside the expanded diameter tube 12 from the open end of one expanded diameter tube 12 and pulled from the through-hole 12b-3. Thereafter, the washer tube 20 is successively passed through the through-hole of the small diameter ring 33 of the tube securing material 30 externally attached to the small diameter tube 11, and is thus secured along the outer surface of the small diameter tube 11. The washer tube 20 is then passed through the through-hole 13b-3 of the other expanded diameter tube 13, is inserted inside the expanded diameter tube 13, and is drawn out from that open end.

The washer tube 20 attached to the outer surface of the small diameter tube 11 is secured with a gap which has the same thickness as continuous portions 34 between the large diameter ring 31 and the small diameter ring 33 at the outer surface of the small diameter tube 11.

Insertion into the grommet 10 of the electrical wire group W of a wire harness is done by inserting the electrical wire group W from an opening of expanded diameter tube 12 at one side of the grommet 10 and passing it through the small diameter tube 11. Then, the electrical wire group W is drawn out from an opening of the expanded diameter tube 13 at the other side of the grommet 10. In doing so, the connector C, that is connected to the terminal of the electrical wire group W, is secured inside the expanded diameter tube 12.

As described above, along with internally inserting the electrical wire group W of a wire harness, the grommet 10 that secures the washer tube 20 to the outer surface of the small diameter tube 11 is secured to a vehicle by meshing the vehicle latching grooves 12c, 13c of the expanded diameter tubes 12, 13 into peripheral edges of the through-holes cut into the rear door panel and vehicle panel in the manufacturing line of an automobile.

According to the composition described above, the washer tube is secured along the outer peripheral surface of the small diameter tube 11 by virtue of the tube securing material 30, without inserting the washer tube 20 into the narrow space inside the small diameter tube 11 of the grommet 10. Because of this, when the grommet 10 and washer tube 20 bend due to the opening and closing action of the vehicle door, they do not rub together, thereby making it is possible to prevent damage to the washer tube 20 and also to prevent fluid leaks.

Also, because the convex portion 14a is provided on the tube meshing groove 14 of the grommet 10 along with the concave portion 32a provided on the tube securing material 30 that meshes with the convex portion 14a, any movement in the peripheral direction of the tube securing material 30 can be restricted by virtue of meshing the concave portion 32a into the convex portion 14a, thereby making simple installations possible.

Furthermore, positional shifting in the peripheral direction of the tube securing material 30 can be prevented after installing the tube securing material 30. In addition, if the washer tube 20 is secured to a suitable position beforehand, shifting and interference of the washer tube 20 with the vehicle panel can be prevented.

Figure 7A:
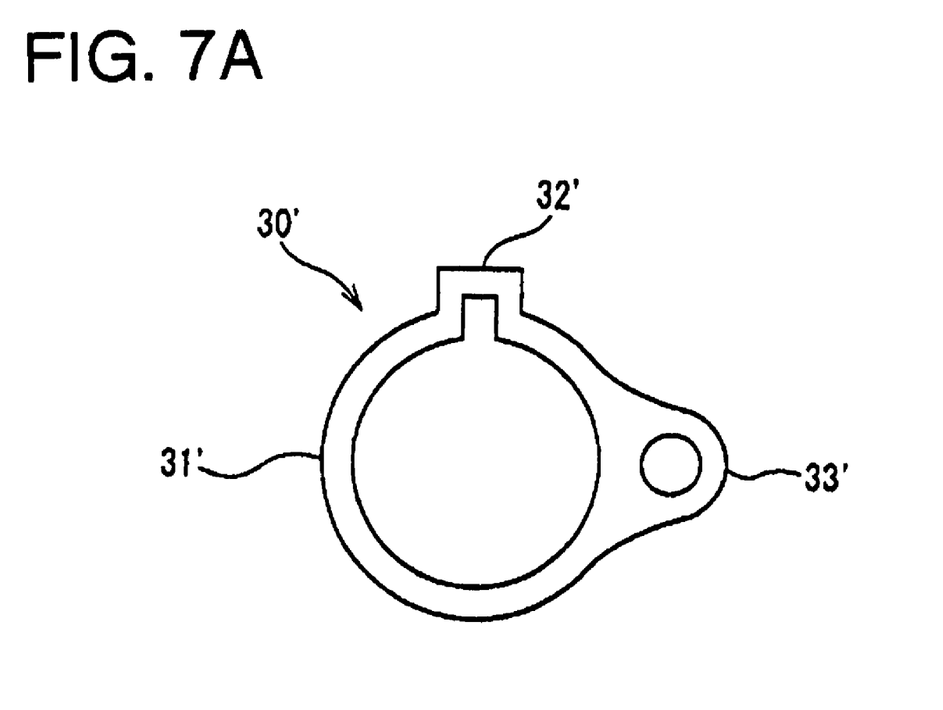
FIG. 7A is a drawing that shows the tube securing material, according to a second alternate embodiment.
Figure 7B:
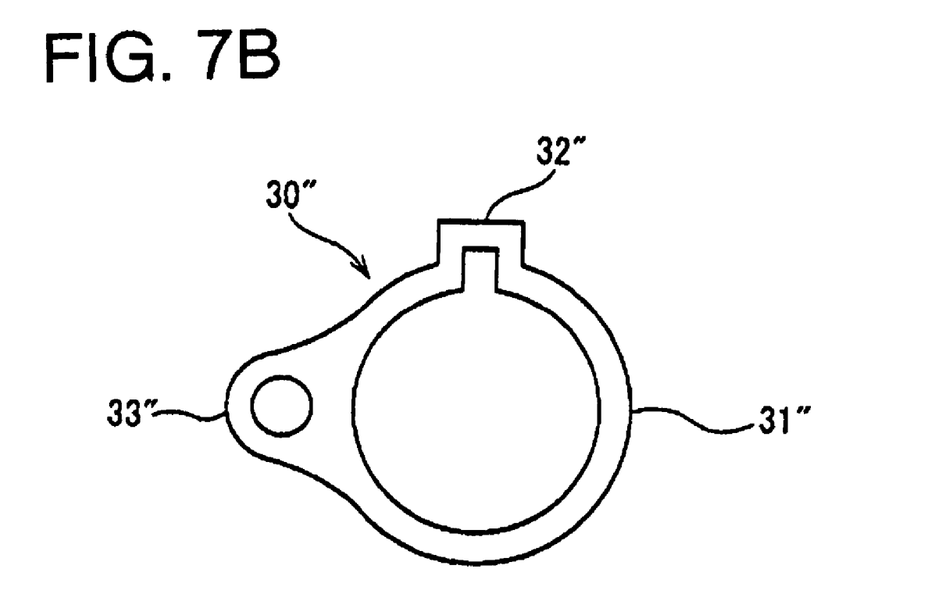
FIG. 7B is a drawing that shows the tube securing material, according to a third embodiment.

FIGS. 7A and 7B show tube securing material according to two alternate embodiments of the present invention. The alternate embodiments of the present invention differ from the first embodiment of the present invention according to the shape of the tube securing material, i.e., 30' and 30" in the alternate embodiments. That is, in the first embodiment with respect to FIG. 1, the positioning protrusion 32 and small diameter ring 33 are provided at opposing positions. In the second embodiment (see FIG. 7A) of the tube securing material 30', the small diameter ring 33' is provided at a position 90° shifted in the clockwise direction with respect to the positioning protrusion 32'. With respect to the third embodiment (see FIG. 7B) of the tube securing material 30", the small diameter ring 33" is provided at a position 270° shifted in the clockwise direction with respect to the positioning protrusion 32".

The tube securing material of the various embodiments may be different in color. For example, if the color of the tube securing material 30 of the first embodiment mentioned above is black, the color of the tube securing material 30' of the second embodiment may be yellow and the color of the tube securing material of the third embodiment 30" may be blue.

According to the construction described above, because the small diameter ring 33', 33" of the tube securing material 30', 30" is provided at a different position with respect to the positioning protrusion 32', 32", the position where the washer tube 20 is arranged along the small diameter tube 11 can be changed, even if an identical grommet 10 is used in a different type of automobile. Thus, the grommet 10 may be used in different types of automobiles, even though each type of automobile may require arrangement of the washer tube 20 at a particular position that does not interfere with the vehicle panel.

Even further, because the colors of the different shaped tube securing material 30, 30', 30" are different, it is easy to distinguish between the different tube securing materials, thereby making it possible to prevent a particular shaped tube securing material from being mistakenly installed.

Although the invention has been described with reference to an exemplary embodiment, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed. Rather, the invention extends to all functionally equivalent structures, methods, and uses such as are within the scope of the appended claims.

What is claimed is:

1. A construction comprising a grommet provided with an expanded diameter tube on at least one end of a small diameter tube through which an electrical wire group of a wire harness extends, and configured to secure a washer tube to the grommet formed from an elastic body, wherein a vehicle latching groove is provided on an outer peripheral surface of said expanded diameter tube, the construction comprising:
   a tube securing member that includes a large diameter ring, and a small diameter ring that protrudes from one part of an outer peripheral surface of said large diameter ring, said large diameter ring of an tube securing member being secured on an outer surface of said small diameter tube, said washer tube extending through said small diameter ring, wherein the washer tube is secured along said outer surface of said small diameter tube.

2. The construction to secure a washer tube to the grommet according to claim 1, wherein a convex portion is provided on one part of said outer surface of said small diameter tube that mates with a concave portion of a positioning protrusion that is provided on one part of said large diameter ring, and wherein said tube securing member is made of rubber.

3. The construction to secure a washer tube to the grommet according to claim 2, wherein the small diameter tube of said grommet is generally accordion-shaped and is provided with continuously rising and falling portions, an annular tube meshing groove being provided on a portion of the small diameter tube, said large diameter ring of said tube securing member being externally pressed into the annular tube meshing groove, the meshing groove having a convex portion provided on a surface thereof.

4. The construction to secure a washer tube to the grommet according to claim 2, wherein said small diameter ring that protrudes from said outer peripheral surface of said large diameter ring of said tube securing member and said positioning protrusion are positioned with an angular gap corresponding to a type of vehicle.

5. The construction to secure a washer tube to the grommet according to claim 1, wherein said washer tube secured via said tube securing member on said outer surface of said small diameter tube, is inserted into a through-hole provided on said expanded diameter tube of the grommet and extends from an open end of said expanded diameter tube and;
   said through-hole provided on said expanded diameter tube is formed as an open end by cutting off a closed wall when inserting said washer tube.

6. The construction to secure a washer tube to the grommet according to claim 3, wherein said small diameter ring that protrudes from said outer peripheral surface of said large diameter ring of said tube securing member and said positioning protrusion are positioned with an angular gap corresponding to a type of vehicle.

7. The construction to secure a washer tube to the grommet according to claim 2, wherein said washer tube secured via said tube, securing member on said outer surface of said small diameter tube, is inserted into a through-hole provided on said expanded diameter tube of the grommet and extends from an open end of said expanded diameter tube and;
   said through-hole provided on said expanded diameter tube is formed as an open end by cutting off a closed wall when inserting said washer tube.

8. The construction to secure a washer tube to the grommet according to claim 3, wherein said washer tube secured via said tube securing member on said outer surface of said small diameter tube, is inserted into a through-hole provided on said expanded diameter tube of the grommet and extends from an open end of said expanded diameter tube and;

said through-hole provided on said expanded diameter tube is formed as an open end by cutting off a closed wall when inserting said washer tube.

9. The construction to secure a washer tube to the grommet according to claim 4, wherein said washer tube secured via said tube, securing member on said outer surface of said small diameter tube, is inserted into a through-hole provided on said expanded diameter tube of the grommet and extends from an open end of said expanded diameter tube and;

said through-hole provided on said expanded diameter tube is formed as an open end by cutting off a closed wall when inserting said washer tube.

10. A grommet assembly comprising:
a washer tube;
a main tube through which an electrical wire group is extendible;
a first end tube connected to a first end of the main tube and having a larger diameter than the main tube;
a second end tube connected to a second end of the main tube and having a larger diameter than the main tube; and
a washer tube securing element, the washer tube securing element comprising a member having a main tube ring and a washer tube ring;
wherein the main tube extends through the main tube ring and the washer tube extends through the washer tube ring.

11. The grommet assembly according to claim 10, further comprising:
a projection provided on the main tube ring;
a recess provided in the main tube ring, the recess being formed at a location on the main tube ring corresponding to the projection; and
a generally convex portion provided on at least one portion of an outer surface of the main tube, the generally convex portion extending into the recess to secure the washer tube to the grommet assembly.

12. The grommet assembly according to claim 11, wherein the washer tube ring is spaced from the projection by an angle of 180 degrees.

13. The grommet assembly according to claim 11, wherein the washer tube ring is spaced from the projection by an angle of 90 degrees.

14. The grommet assembly according to claim 11, wherein the main tube comprises a plurality of intermittent ridges and depressions.

15. The grommet assembly according to claim 11, further comprising a through-hole formed in each of the first end tube end the second end tube.

16. The grommet assembly according to claim 15, wherein the main tube extends into the through-hole formed in the first end tube.

17. The grommet assembly according to claim 15, wherein the main tube extends into the through-hole formed in the second end tube.

* * * * *